No. 847,887. PATENTED MAR. 19, 1907.
B. BERGMANN.
COTTON BOLL WEEVIL DESTROYER.
APPLICATION FILED FEB. 28, 1906.
2 SHEETS—SHEET 1.
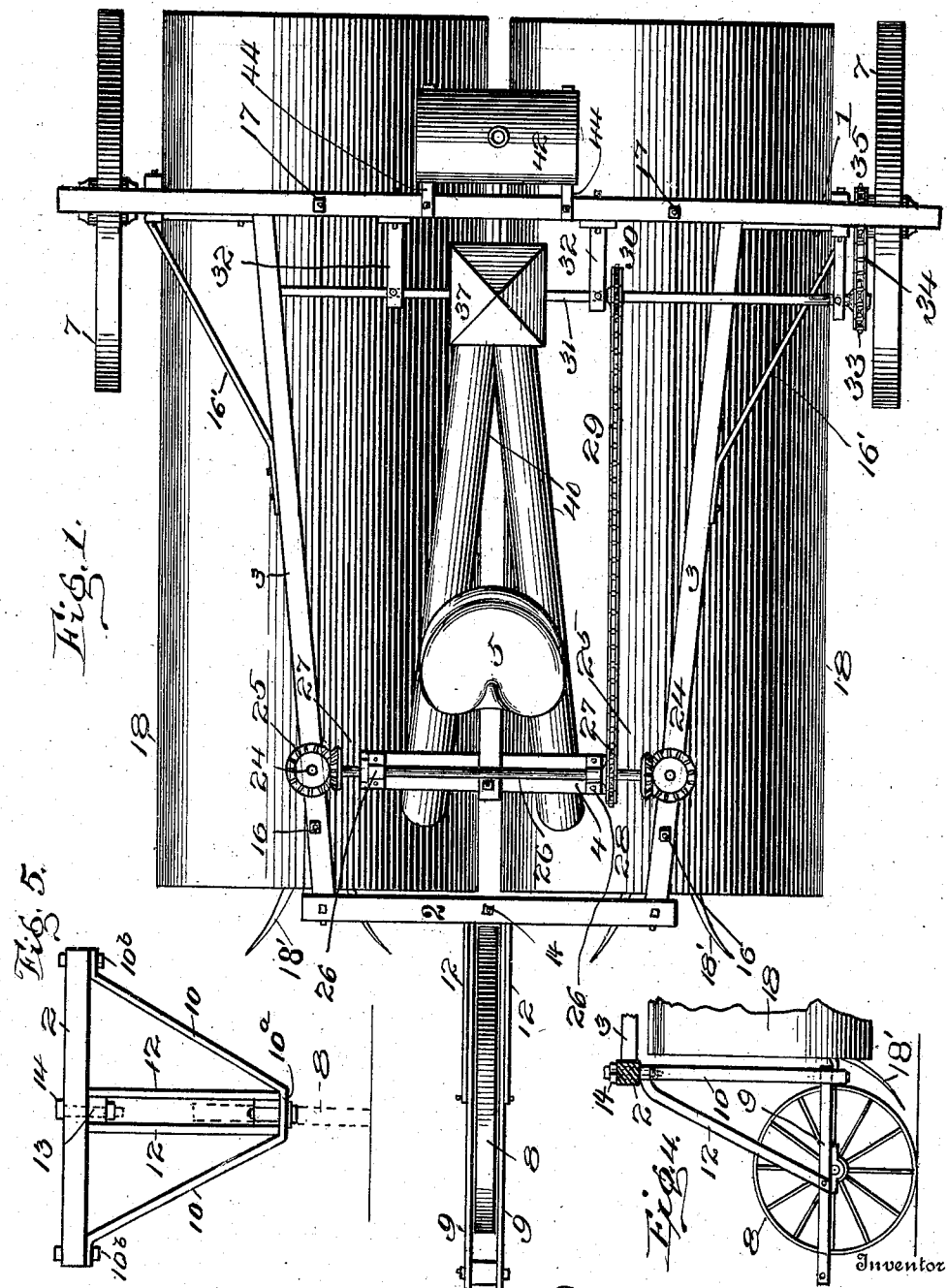

No. 847,887. PATENTED MAR. 19, 1907.
B. BERGMANN.
COTTON BOLL WEEVIL DESTROYER.
APPLICATION FILED FEB. 28, 1906.
2 SHEETS—SHEET 2.
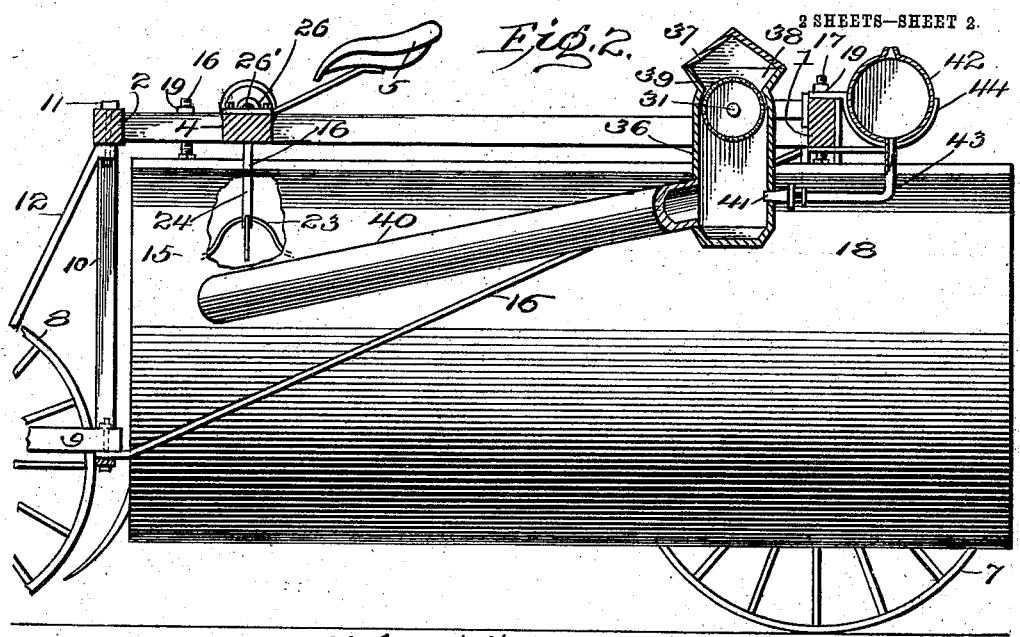
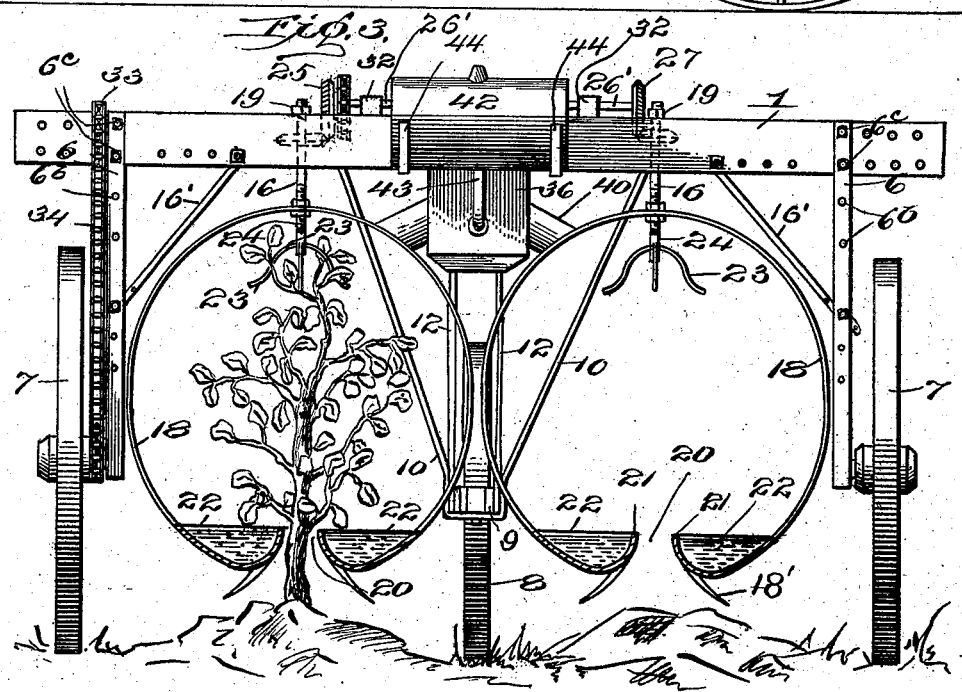
Witnesses
Inventor
Bertha Bergmann
By Mason, Fenwick & Lawrence
Attorneys

UNITED STATES PATENT OFFICE.

BERTHA BERGMANN, OF GOLIAD, TEXAS.

COTTON-BOLL-WEEVIL DESTROYER.

No. 847,887. Specification of Letters Patent. Patented March 19, 1907.

Application filed February 28, 1906. Serial No. 303,563.

*To all whom it may concern:*

Be it known that I, BERTHA BERGMANN, a citizen of the United States, residing at Goliad, in the county of Goliad and State of Texas, have invented certain new and useful Improvements in Cotton-Boll-Weevil Destroyers; and I do hereby declare the following to be a full, clear, and exact description of the invention, such as will enable others skilled in the art to which it appertains to make and use the same.

This invention relates to a machine for destroying cotton-boll weevils.

The object of the invention is the provision of means for facilitating the fumigating and smoking of plants as the same pass through the machine, and at the same time removing the insects which may be upon the plants and catching the same in receptacles containing liquid, preferably oil.

With these and other objects in view the invention consists of certain other novel constructions, combinations, and arrangements of parts, as will be hereinafter fully described and claimed.

In the drawings, Figure 1 is a top plan view of the mechanism constructed in accordance with the present invention. Fig. 2 is a longitudinal central sectional view of the mechanism, showing one of the cylindrical casings or drums in side elevation. Fig. 3 is a rear view of the mechanism depicted in Fig. 1. Fig. 4 is a fragmentary view, in side elevation, of the front portion of the mechanism. Fig. 5 is a front view of the frame, to which is secured a guide-wheel.

Referring to the drawings by numerals, 1 indicates the rear transverse horizontal beam, and 2 the front beam. The beams 1 and 2 are parallel and are connected by the longitudinally-extending side beams 3 3. The side beams 3 diverge from the front beam 2 to the rear beam 1. Contiguous to the front beam 2 is a transverse beam 4, upon which beam is secured an ordinary adjustable seat. A pair of vertical standards 6 6, Fig. 3, are secured at the ends of beam 1, which standards are preferably transversely adjustable to accommodate the machine to the width of the plant rows. The standards 6 6 are also vertically adjustable to accommodate the machine to the height of the plants over which the destroyer is to pass. This horizontal and vertical adjustment of the standards 6 is permitted by any suitable means, preferably by forming apertures $6^a$ in the beam 1 and apertures $6^b$ in the vertical standards 6. Transverse fastening means—as, for instance, bolts $6^c$—are positioned within the registering apertures of the standards and beam 1 for the purpose of securing the standards 6 in adjusted positions. Wheels 7 7 are secured by any suitable means to the lower ends of the vertical standards.

A guide-wheel 8 is journaled in bearings carried by horizontal beams 9. The parallel beams 9 form a part of the guide-frame, which is partly supported by the wheel 8, said frame being journaled at its upper end centrally upon the transverse front beam 2. The lower portion of the guide-wheel frame is journaled upon the horizontal portion $10^a$ of the substantially V-shaped vertical standard or bracket 10, which standard is secured to the transverse beam 2 by suitable fastening means—as, for instance, bolts $10^b$. The vertical standard 10 is fixedly connected at its upper ends to transverse beam 2. The parallel beams 9 9 are fixedly secured together at both ends by any suitable fastening means, which fastening means pass through blocks interposed between said beams 9. The inner ends of the horizontal beams 9 engage the horizontal portion $10^a$ of the substantially V-shaped member 10. Pivotally secured to the front transverse beam 2 are inclined standards 12 12. These standards 12 are fixedly secured at their lower ends to the horizontal beams 9 9. A block 13 is positioned between the vertical standards 12 12 near their upper ends, and said standards are secured to said block. A king-bolt 14 is positioned upon and secures the block 13 to the beam 2. The standards 12 12 constitute braces for the pivotally-mounted frame carried by the guide-wheel 8.

The pivotally-mounted frame carried by the guide-wheel 8 is braced by a longitudinally-extending brace 15, which brace is fixedly secured at its front end to the V-shaped standard 10 and at its rear end to the beam 1. It is desirable to have the longitudinally-extending brace 15 comparatively small in transverse section, and for this reason I preferably form the same of tubing.

A pair of braces 16' 16' are adjustably secured to the diverging longitudinally-extending side beams 3 3 and to the vertical standards 6 6. These braces 16' 16' are employed for giving the necessary rigidity to the standards 6 6, as it will be obvious that most of the weight is supported by these standards, to which are secured wheels 7 7.

Supporting members 16 are positioned upon the front portions of beams 3, while similar supporting members 17 are carried by the rear beam 1, and a pair of casings or drums 18 are carried by the members 16 and 17, each fixedly secured at its front end to one of the members 16 and at its rear end to one of the members 17, which said members are retained from displacement by the nuts 19, bearing upon the beams. The destroyer is preferably constructed for a two-row capacity. Each of the casings or drums 18 is open at both ends and is slotted or slitted as shown at 20, Fig. 3, so as to permit the plant or plants to pass through the casing as the destroyer passes over the same. Each casing or drum 18 is provided at its front end with diverging guide teeth or points 18', which extend downward for gathering up or facilitating the directing of a plant into the longitudinally-slitted or open portion 20 of the drum as the destroyer passes over the same. It will therefore be obvious that this guiding means 18' materially assists the operation of the destroyer without injury to the plants, as it is a known fact that the plants in a row are often irregular and not in alinement.

Each casing is provided with upturned lips or extensions 21 21, which constitute receptacles, as the portion of the casings 19, which are provided with said lips 21, are closed at their ends, as at 22, Fig. 3. These upturned lips or extensions 21 and ends 22 constitute a receptacle within which a liquid may be placed for drowning any of the insects which are shaken off the plant, preferably by means of a rotatable stirrer or agitator 23, which operates within the forward end of each of the casings 18.

Each of the stirrers comprises a vertical shaft 24, having at its lower ends a plurality of outwardly-spreading fingers, while the upper end of each shaft 24 is provided with a horizontal bevel-gear 25. The gear is positioned contiguous to the transverse intermediate beam 4 as the upper end of each shaft 1 extends a slight distance beyond said beam 4. Suitable bearings 26 are carried by the upper portion of the beam 4, and within said bearings a horizontal shaft 26' is journaled. The ends of shaft 26' carry beveled gears 27, which mesh with similar gears 25. A sprocket-wheel 28 is fixed to shaft 26, preferably contiguous to one of the bevel-gears 27. A sprocket-chain 29 is positioned upon sprocket-wheel 28. Said chain 29 passes around a sprocket-wheel 30, fixed to shaft 31, that is journaled in parallel horizontal brackets 32, secured to one side of the rear horizontal beam 1. Fixed to shaft 31 and preferably at one end is a sprocket-wheel 33, around which a sprocket-chain 34 passes, which chain also passes around a sprocket-wheel 35, fixed to the hub of one of the wheels 7. It will be obvious that when rotary movement is imparted to sprocket-wheel 30 similar movement will also be imparted to the shafts 24, thereby rotating the stirrers or agitators 23 for shaking the plants as the machine passes over the same. The shaking of said plants will of course remove insects from said plants and cause the same to drop into the liquid within the receptacles formed upon each of the casings 18. I also provide means for smoking or fumigating the plants as they pass through the machine, and said means comprises a vertical casing 36, which is carried by the frame of the mechanism near the rear beam 1.

A removable cover 37 is carried by the vertical casing 36. A hopper 38 is formed within the upper portion of said casing, and a rotatable cylindrical sieve is positioned within said auxiliary casing contiguous to said hopper 38, the sieve 39 closing the bottom of said hopper. The sieve 39 is fixed to the shaft 31, and consequently when rotary movement is imparted to said shaft said sieve will also be rotated. Secured to the lower portion of said vertical or auxiliary casing 36 is a pair of pipes or tubings 40, which extend between and communicate with the interior of the casings 18 near their front end. A burner 41 extends into the auxiliary casing 36, and said burner is supplied with an oil from a tank 42 by means of the pipe 43. The tank 42 is preferably supported upon a pair of brackets 44, which extend rearwardly from the horizontal rear beam 1. I preferably place sulfur in the hopper 38, and as the machine passes along over the plants the sieve will be actuated for sifting the sulfur from the hopper 38 into the flame of the burner 41, creating a smoke which will be discharged into the forward end of the casings 18 through the medium of the pipes 40.

From the foregoing description it will be readily apparent that the casings 18 are rigidly connected to the supporting-frame and that a vertical adjustment thereof can only be obtained through the medium of the standards 6, which are adjustably connected to the rear cross-beam 1. The burner 41 is positioned within the lower portion of the auxiliary casing 36 so as to burn the fumigating material—as, for instance, sulfur—as it drops downward toward the bottom of the auxiliary casing and may be ignited in any convenient manner, one means for which may be by inserting a fire-carrying wire or rod through one of the pipes 40. The stirrers or agitators 23 and the revoluble sieve 39 will not be rotated when the mechanism is stationary.

What I claim is—

1. A cotton-boll-weevil destroyer, comprising a support, casings carried by said support, a vertical casing carried by said support, a sieve positioned within said last-mentioned casing, pipes connecting said vertical casing with said first-mentioned casings, and a burner extending into said vertical casing.

2. A cotton-boll-weevil destroyer, comprising a support, primary casings carried by said support, an auxiliary casing carried by said support, said auxiliary casing provided with pipes, each pipe communicating with the primary casing, a burner connected to said auxiliary casing, means for supplying a fumigating material to said burner within said auxiliary casing.

3. In a cotton-boll-weevil destroyer, the combination with a support, of primary casings carried by said support, an auxiliary casing carried by said support, a burner positioned within the lower portion of said auxiliary casing, a sieve positioned within the upper portion of said last-mentioned casing, and pipes connecting said auxiliary casing to said first-mentioned casings.

4. In a cotton-boll-weevil destroyer, the combination with a support, primary casings carried by said support, of revoluble agitators carried by said support, and extending into said casings, an auxiliary casing carried by said support, pipes connecting said auxiliary casing to said primary casings, a burner positioned within the lower portion of said auxiliary casing, a revoluble sieve positioned within the upper portion of said casing, a hopper formed upon the upper portion of said casing contiguous to said sieve, and means for synchronously rotating said agitators and said sieve, said sieve being capable of feeding material to the flame of said burner.

5. A cotton-boll-weevil destroyer, comprising a portable support, an imperforate cylindrical casing carried by said support in position to embrace a plant, said casing provided with a slitted bottom, and receptacles formed in said casing contiguous to said slit.

6. A cotton-boll-weevil destroyer, comprising a portable support, an adjustable casing carried by said support, said casing provided with a longitudinally-extended slitted opening, and arranged to wholly embrace a plant, longitudinally-extending receptacles formed upon said casing contiguous to the slitted opening, and agitating means positioned wholly within said casing.

7. A cotton-boll-weevil destroyer, comprising a portable support, parallel, substantially cylindrical, imperforate casings carried by said support, and positioned to wholly embrace a plant, said casings each provided with a slitted bottom and with parallel receptacles formed adjacent said slits, and agitating means positioned wholly within each of said casings.

8. A cotton-boll-weevil destroyer, embodying a casing, an agitator disposed wholly within the casing, a receptacle within the casing and below the agitator, and means to apply a fumigant within the casing.

9. A cotton-boll-weevil destroyer, embodying a slitted casing, proportioned to wholly embrace a plant, receptacles formed adjacent the slit of the casing, and an agitator wholly within the casing and above the receptacles.

10. In a cotton-boll-weevil destroyer, a wheeled vehicle, a substantially cylindrical, slitted drum carried upon the vehicle, a casing carried upon the drum, means within the casing for igniting a fumigant, and a pipe leading from the casing to the cylinder adjacent its forward end.

In testimony whereof I affix my signature in presence of two witnesses.

BERTHA BERGMANN.

Witnesses:
EMIL BERGMANN,
A. H. FECHNER.